United States Patent [19]

Antos et al.

[11] Patent Number: 5,553,185
[45] Date of Patent: Sep. 3, 1996

[54] CONTROLLED DISPERSION OPTICAL WAVEGUIDE

[75] Inventors: A. Joseph Antos, Elmira; Evelyn M. DeLiso, Corning; Yanming Liu, Horseheads; Mark A. Newhouse, Corning; David K. Smith, Painted Post; Carlton M. Truesdale, Corning, all of N.Y.

[73] Assignee: Corning Incorporated, Corning, N.Y.

[21] Appl. No.: 364,797

[22] Filed: Dec. 27, 1994

[51] Int. Cl.⁶ ..................................................... G02B 6/22
[52] U.S. Cl. ............................. 385/127; 385/124; 385/126
[58] Field of Search ..................................... 385/128, 124, 385/126, 127

[56] References Cited

U.S. PATENT DOCUMENTS

| | | | |
|---|---|---|---|
| 4,372,647 | 2/1983 | Okamoto et al. | 385/127 |
| 4,691,991 | 9/1987 | Unger | 385/127 |
| 4,715,679 | 12/1987 | Bhagavatula | 385/126 |
| 4,877,304 | 10/1989 | Bhagavatula | 385/123 X |
| 5,013,131 | 5/1991 | Fotheringham | 385/124 |
| 5,191,631 | 3/1993 | Rosenberg | 385/123 |
| 5,327,516 | 7/1994 | Chraplyvy et al. | 385/123 |

*Primary Examiner*—Rodney B. Bovernick
*Assistant Examiner*—Hemang Sanghavi
*Attorney, Agent, or Firm*—William J. Chervenak

[57] ABSTRACT

A single mode optical waveguide fiber having low, non-zero dispersion over a pre-selected wavelength range is disclosed. The refractive index profile of the core is characterized in that the core includes a plurality of distinct regions, each having an index profile, and a radius or width. By adjusting the index profile sizes and shapes of the plurality of core regions, a waveguide fiber may be made having a set of properties tailored for a high performance telecommunication system. In particular, dispersion slope can be maintained less than 0.05 ps/nm²-km and absolute magnitude of total dispersion maintained in the range of 0.5 to 3.5 ps/nm-km over a pre-selected wavelength range. The zero dispersion wavelength is outside the pre-selected wavelength range and the cut off wavelength and mode field diameter are controlled to target values.

14 Claims, 3 Drawing Sheets

CONTROLLED DISPERSION OPTICAL WAVEGUIDE

BACKGROUND

The invention relates to a single mode optical waveguide fiber for both single and multiple wavelength channel high performance telecommunications systems. The inventive waveguide fiber is characterized by low but finite dispersion and low dispersion slope over a wide wavelength range.

A high performance telecommunication system carries high data rates over long distances with no electronic regeneration. For example, rates of 10 Gb/s, or more, over unregenerated distances of three to five hundred kilometers have been achieved. A high performance system may employ high power signal lasers, optical amplifiers for repeaters, or wavelength division multiplexing.

Non-linear optical effects, such as four wave mixing and self phase modulation, can become system limiting effects in these high performance systems.

Four wave mixing can be essentially eliminated by maintaining a non-zero absolute vale of dispersion over the range of wavelengths used for wavelength division multiplexing, thereby preventing phase matching and thus interference between the multiplexed signals. However, the dispersion must not be so high as to limit system bit rate or unrepeatered length. Therefore, best performance is realized when the dispersion is maintained in the range of about 0.50 ps/nm/km to 3.5 ps/nm/km over a pre-selected wavelength range of operation.

In addition, the dispersion must be controlled while maintaining control of other required attributes such as attenuation, waveguide fiber geometry, and mode field diameter. The mode field diameter, in particular must be above a pre-selected lower limit, thereby keeping light power per unit area low enough to avoid self phase modulation.

To provide an optical waveguide having the characteristics required for these sophisticated systems, a variety of refractive index profiles have been modelled and tested. The compound core design, discussed in U.S. Pat. No. 4,715,679, Bhagavatula, offers the flexibility to meet high performance system requirements while maintaining the basic requirements such as low attenuation, narrow geometry tolerances, acceptable bending resistance, and high tensile strength. Furthermore, certain of the compound core designs are relatively easy to manufacture, thereby providing enhanced optical waveguide performance without prohibitive cost increases.

DEFINITIONS

Refractive index profile describes the variation of glass refractive index along a waveguide fiber radius.

Refractive index delta is defined as $(n_1^2 - n_c^2)/2n_1^2$ where $n_1$ is the maximum refractive index of a core region and $n_c$ is the cladding layer refractive index.

An alpha profile is a refractive index profile described by the equation $n(r) = n_o[1-(r/a)^{alpha}]$, where $n_o$ is the refractive index on the waveguide fiber centerline and $a$ is the radius of the portion of the waveguide described by $n(r)$. In general, alpha can take on any value between 0 and an arbitrarily large number. However, alpha equal to zero is trivial and a profile with alpha larger than about 4 is nearly a step function.

The radii of the regions of the core are defined in terms of the index of refraction. A particular region begins at the point where the refractive index characteristic of that region begins and a particular region ends at the last point where the refractive index is characteristic of that particular region. Radius will have this definition unless otherwise noted in the text.—Total dispersion is defined as the algebraic sum of waveguide dispersion and material dispersion. Total dispersion is sometimes called chromatic dispersion in the art. The units of total dispersion are ps/nm-km.

SUMMARY OF THE INVENTION

The present invention meets the need for an optical waveguide suited for high performance systems. The inventive waveguide features low, non-zero total dispersion over a pre-selected wavelength range and excellent attenuation and geometry control, thereby allowing high bit rate, wavelength division multiplexing.

A first aspect of the invention is an optical waveguide fiber for high performance systems, having a core region surrounded by a cladding layer. The cladding layer has a constant refractive index $n_c$. The core region is divided into a central region having a refractive index profile and a radius $r_1$, and a plurality of annular regions, surrounding the central region, each annular region having a refractive index profile and a width. The waveguide center line is chosen as zero radius. The annular widths are measured along a radius, i.e., along the refractive index profile baseline.

The refractive index profile and radius of the central region and the refractive index profiles and widths of the plurality of annular regions are chosen to provide the waveguide fiber properties:

the absolute value of total dispersion is in the range of about 0.50 to 3.5 ps/nm-km; and, the absolute value of total dispersion slope is no greater than about 0.05 ps/ nm²-km.

The cut off wavelength of the inventive waveguide, as measured on the fiber prior to cabling, is greater than about 1300 nm, to provide bend resistance. Also the attenuation of the waveguide is less than about 0.25 dB/km in accord with the long repeater spacing of high performance systems.

At least one of the maximum refractive indexes of the respective annular regions is less than $n_c$.

These waveguide properties pertain to a pre-selected wavelength range. Over this pre-selected wavelength range the total dispersion is not zero. The range is, in general, no less than 25 nm in width and may be centered over essentially any segment of the operating wavelength range of optical waveguide fiber. Because of low attenuation and absence of OH ion absorption, the wavelength ranges of about 1270 to 1350 nm and from about 1475 to 1600 nm are target wavelength ranges for the inventive waveguide fiber.

In an embodiment of this first aspect, the central region has a maximum refractive index $n_1 > n_c$ and at least one of the annular regions has a maximum refractive index less than $n_c$.

In a preferred embodiment the innermost annular region, i.e., the annulus adjacent the central region, has a maximum index less than $n_c$. In a further embodiment, the innermost annular region has a constant index profile.

In another embodiment of this first aspect, the central core region has an alpha profile. The preferred alpha profile is that where alpha is about one.

Yet another embodiment of the first aspect of the invention is one wherein the central core region has a constant refractive index, i.e., the central core region is substantially a step.

In a preferred embodiment of the first aspect, the central core region is surrounded by three annular regions. Proceeding outward from the central core region, the first annular region has maximum refractive index $n_2$, the second $n_3$, and the third $n_4$. The relationship among these refractive indexes is $n_2$ and $n_4 < n_c$ and $n_3 > n_c$.

A preferred form of this embodiment is one in which $n_2$ and $n_4$ are constant and $n_3$ is substantially trapezoidal in shape. The dimensions pertinent to this embodiment are:

central region radius in the range of about 2.5 to 4.5 microns;
 width of the first, i.e., innermost annulus, is in the range of about 3 to 7.5 microns;
 width of the second annulus is in the range of about 1 to 4 microns; and,
 width of the third annulus is in the range of about 1 to 7 microns.

In another preferred embodiment of this first aspect, the central core region is surrounded by two annular regions. The first annular region, which is adjacent the central core region, has a constant refractive index $n_2$. The second annular region has a refractive index profile substantially trapezoidal in shape and has maximum refractive index $n_3$. In this case, $n_2 < n_c$ and $n_3 > n_c$. The dimensions pertinent to this embodiment are:

central region radius in the range of about 3 to 5 microns;
 width of first annular region in the range of about 3 to 7 microns; and,
 width of second annular region in the range of about 1 to 3 microns.

The choice between these preferred embodiments is made by weighing ease of manufacture against the desirability of obtaining a smaller magnitude of dispersion slope. The relative ease of manufacture depends, in general, on process used.

The index profiles and radii of the core regions may be adjusted to place the at least 25 nm wavelength range, wherein total dispersion is non-zero but relatively low, essentially anywhere in the operating range of the single mode fiber.

The inventive waveguide has a further advantage with regard to manufacturing tolerances. The cut off wavelength of the inventive waveguide is relatively insensitive to variations of % index delta or variations in core radius. The cut off wavelength sensitivity is shown in the drawings and discussed in the detailed description. This insensitivity is attributable to the core profile design, including the design wherein at least one annular region has a maximum refractive index lower than $n_c$.

DETAILED DESCRIPTION OF THE INVENTION

The drawings are not necessarily to scale and are not intended to limit the invention in any way.

The demand for waveguide fiber suitable for high performance telecommunication systems has led to a study of compound core profiles. A compound core, i.e., a core having a plurality of regions, each of which is characterized by a particular refractive index profile, provides several variables which can be adjusted independently of each other. Thus, the probability is good that finding a combination of variables which produce a waveguide fiber suitable for high performance systems is improved compared to a step index design.

In U.S. Pat. No. 4,715,679, Bhagavatula, the structure and properties of a genera of compound core waveguide fibers are disclosed. The present invention is a species of a genus of single mode optical waveguide refractive index profiles disclosed in the '679 patent.

The distinctive and unusual properties of this species are:
 low but non-zero dispersion over an extended wavelength window;
 low total dispersion slope;
 cut off wavelength outside the pre-selected operating wavelength range;
 insensitivity of properties to variations in core size or % refractive index delta; and,
 essentially no degradation of waveguide performance in other aspects, such as, attenuation, bend resistance, strength or geometry control.

A distinction may be made between cut off wavelength measured on the waveguide fiber and cut off wavelength after cabling. The bending typically induced in a cabling process produces a cabled cut off wavelength lower than that measured on the uncabled waveguide. The cabled cut off is the operative parameter. References to cut off wavelength generally refer to cabled cut off unless otherwise stipulated.

Figure 1:
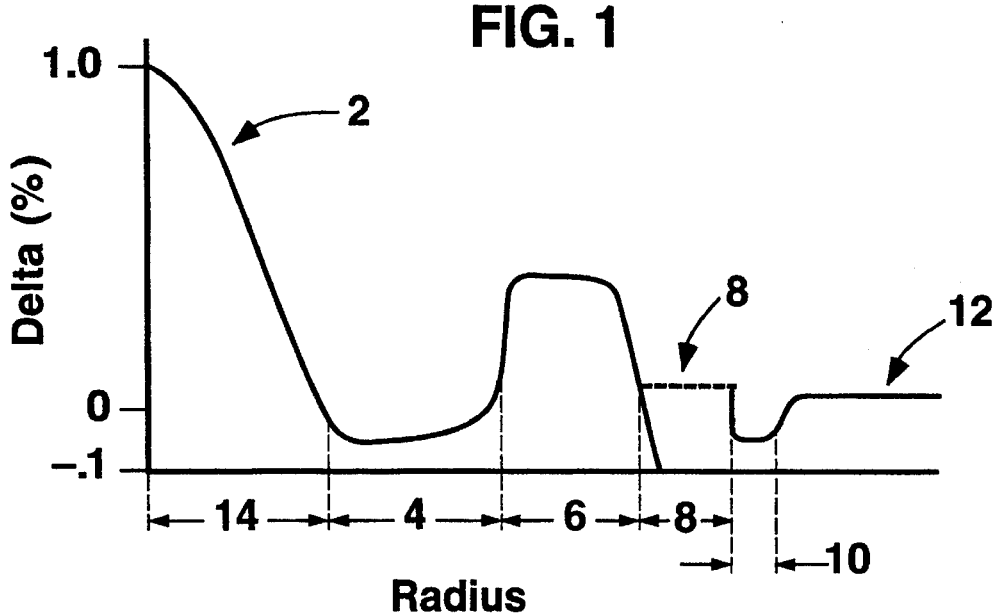
FIG. 1 is an illustration of the inventive profile showing the general profile features.

An index profile characteristic of the species is shown in FIG. 1 which is a chart of percent index delta vs. waveguide fiber radius. The central core region, 2, has a general shape wherein the refractive index delta varies over the radius 14. The shape may follow an alpha profile as discussed above. Also, the central core region may be a step index. In general, the maximum refractive index delta is maintained less than about 1 percent to better control the diffusion of the central region dopant from the waveguide centerline and from the central region outer edge. In addition, maintaining lower central region dopant level lessens mismatch of thermal expansion coefficients between adjacent glass layers, thereby reducing the incidence of preform cracking.

A first annular region, having a width 4, is shown surrounding the central region. In this particular illustration of the inventive profile, this first annulus is shown having a refractive index less than that of cladding 12. It has been discovered that very low total dispersion slope can be achieved when one or more core regions have a maximum refractive index less than the cladding layer. A third core region is shown, having a width 6 and an index profile with a maximum value greater than the cladding refractive index.

The dotted line 8 indicates that an arbitrary number index profile regions may be included. The last annulus is shown having a width 10 and a maximum index less than the cladding layer. In practicing the invention, the number of distinct core regions is limited by the core radius and the narrowest effective annular width. For wavelengths in the operating range from about 1200 nm to 1650 nm, a core region having an annular width less than about 65 nm does not have an affect on the propagating light wave distinguishable from neighboring core regions. That is, the index profile of the narrow core region is effectively averaged with the neighboring regions. Ease of manufacture also is a factor in limiting the number of distinct core regions.

In the present inventive profile, a core having three or four distinct regions, where at least one of the regions has a maximum refractive index less than that of the cladding, is preferred.

Example 1—A Four Region Core

Figure 3:
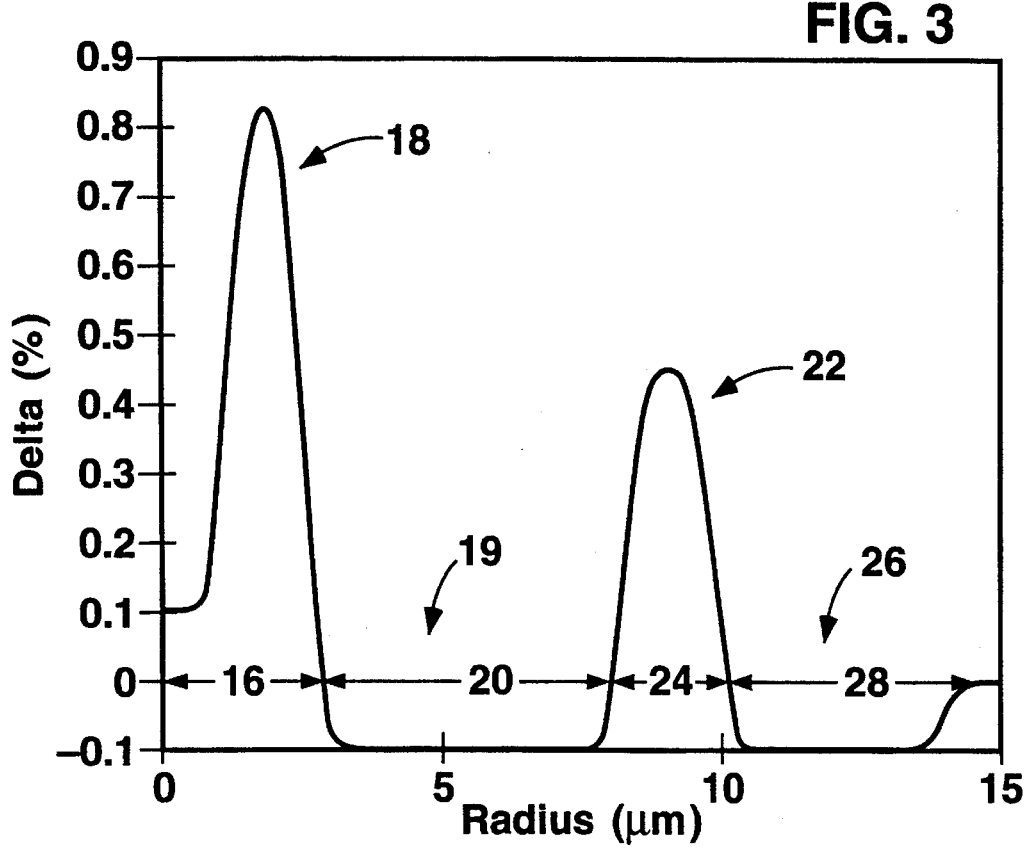
FIG. 3 is an illustration of a preferred embodiment of the inventive profile.

A model of a four region core is shown in FIG. 3. The central core region has a maximum refractive index delta of about 0.85 percent and a radius, 16, of about 2.7 microns. This central profile 18 is essentially a rounded step profile. The narrow center line refractive index dip and the smooth transitions at the interfaces between regions is due to diffusion of dopant atoms during processing of the waveguide fiber.

The first annular region 19 has an index delta of about −0.1 percent and a width 20 of about 5.4 microns. The second annular region 22 has a rounded trapezoidal profile, a maximum refractive index delta of about 0.45 percent, and width 24 of about 2 microns. The third annular region 26 has a refractive index delta of about −0.1 percent and a width 28 of about 4.5 microns.

The calculated properties of the waveguide fiber having this profile are:

| | |
|---|---|
| Mode Field Diameter | 8.00 microns |
| Effective Diameter | 8.10 microns |
| Cut Off Wavelength | 1400 nm |
| Dispersion Slope | 0.034 ps/nm²-km. |

The definition of effective diameter is given below.

Figure 2:
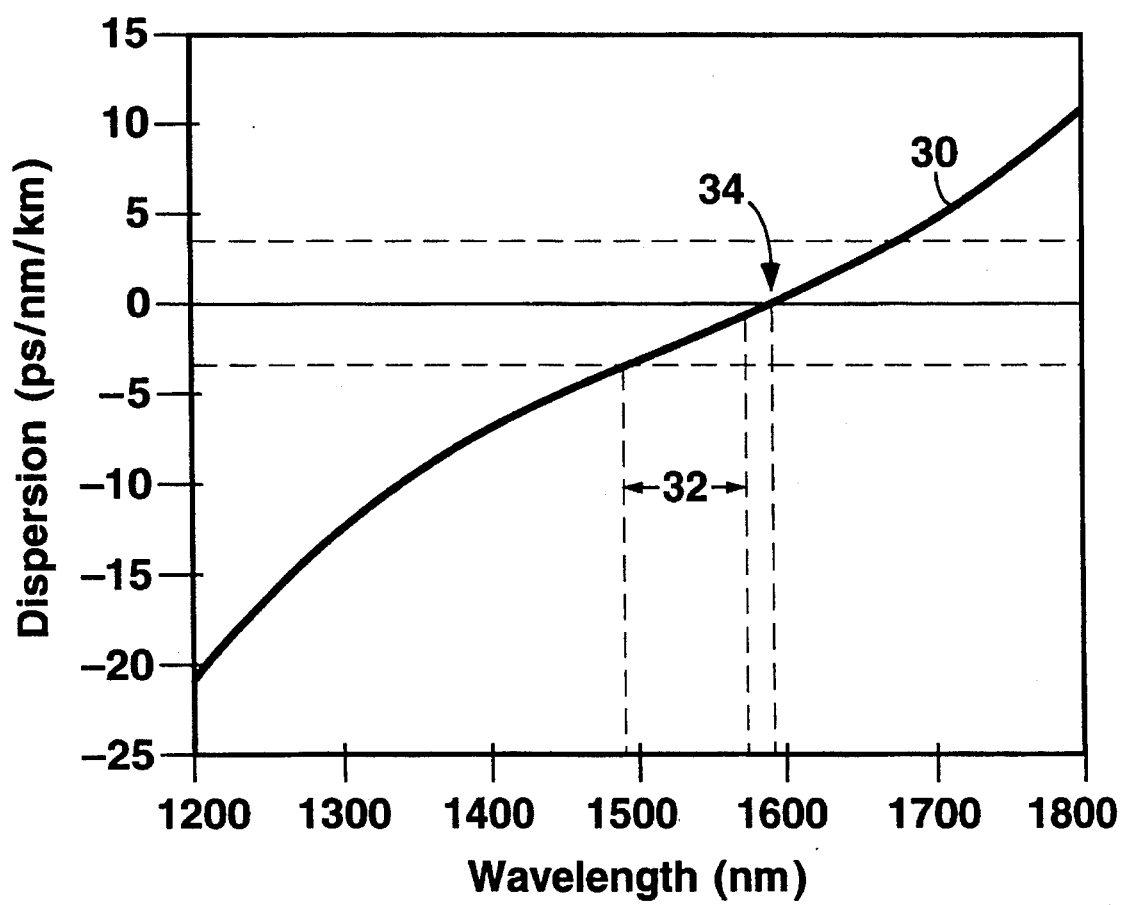
FIG. 2 is a chart of total dispersion vs. wavelength for a waveguide designed for use around a 1550 nm operating window.

FIG. 2 shows the total dispersion curve 30 of the modeled profile charted over a wavelength range of 1200 nm to 1800 nm. The total dispersion is in the range of 0.50 to 3.5 ps/nm-km over wavelength window 32 of about 1490 nm to 1575 nm. Also the zero of dispersion 34 is at about 1593 nm.

These properties are ideal for a waveguide fiber in a high data rate system which may use wavelength division multiplexing or optical amplifiers.

Example 2—A Three Region Core

Figure 4:
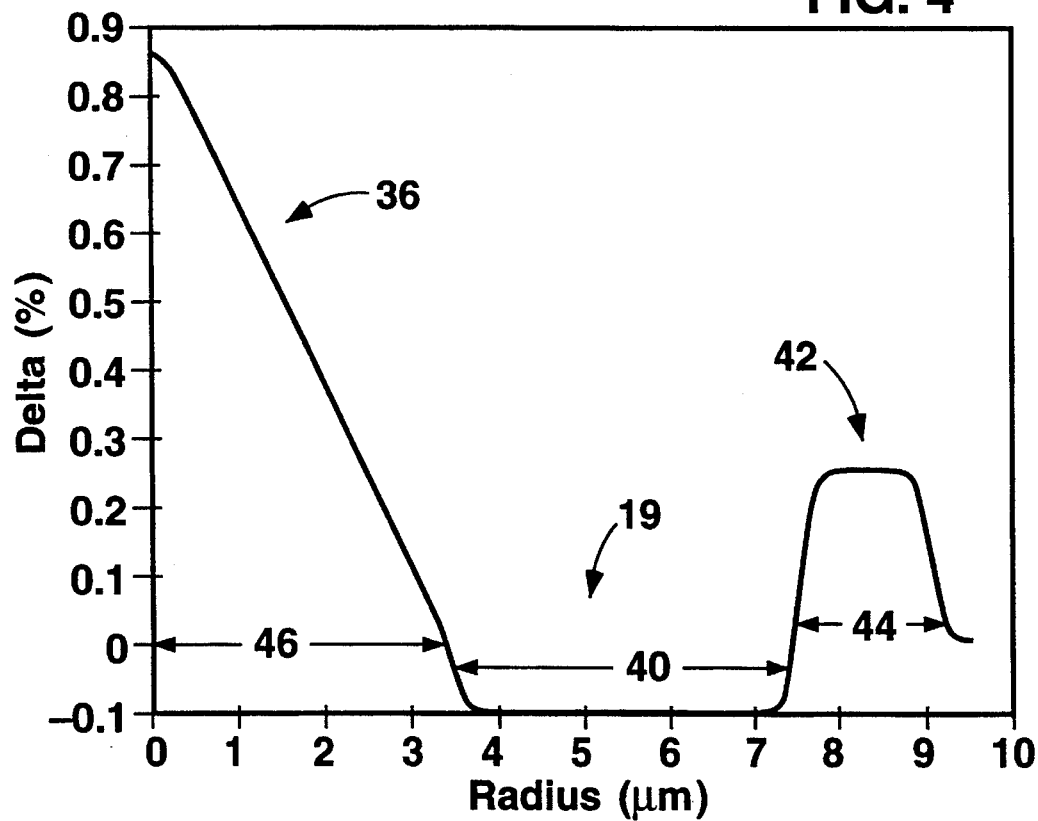
FIG. 4 is an illustration of another preferred embodiment of the inventive profile.

A three region modeled optical waveguide fiber refractive index profile is shown in FIG. 4. As in example 1, the central profile 36 is an alpha profile with alpha about 1 and maximum index delta 0.9 percent. The central core radius 46 is about 3.5 microns. The first annular region 38 has a refractive index delta of about 0.1 percent and a width 40 of about 4 microns. The third annular core region is trapezoidal in shape, having a maximum refractive index delta of about 0.25 percent. The width of the third annulus is about 1.5 microns.

The calculated properties of a waveguide fiber having this profile are:

| | |
|---|---|
| Mode Field Diameter | 7.75 microns |
| Cut Off Wavelength | 1298 nm |
| Dispersion Slope | 0.032 ps/nm²-km |
| Dispersion at 1550 nm | −2 ps/nm-km. |

The properties of the waveguides modeled in examples 1 and 2 are similar except for cut off wavelength. As would be expected, the optical waveguide of example 1 has a bend resistance better than the waveguide of example 2 by about a factor of 2. Thus the extra steps involved in manufacturing the profile of example 1 would be cost effective in those cases where superior bend performance is required.

Figure 5:
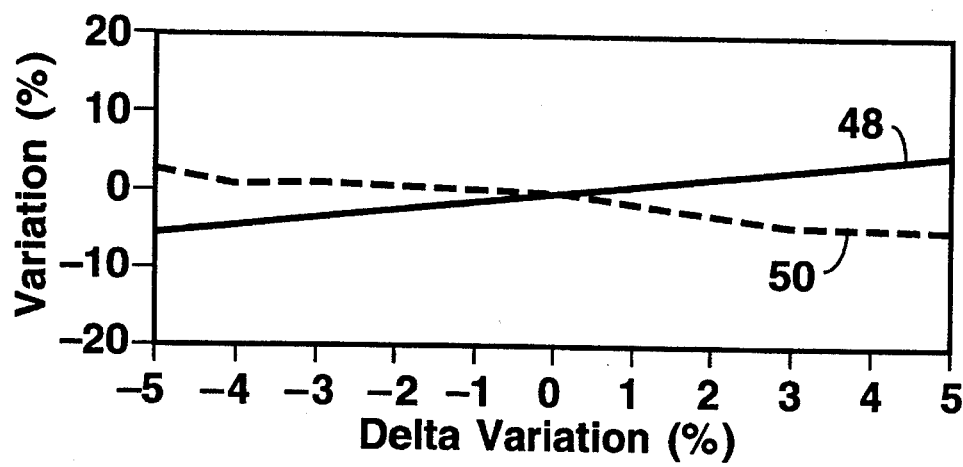
FIG. 5 is a chart of cut off wavelength variation with core radius variation.
Figure 6:
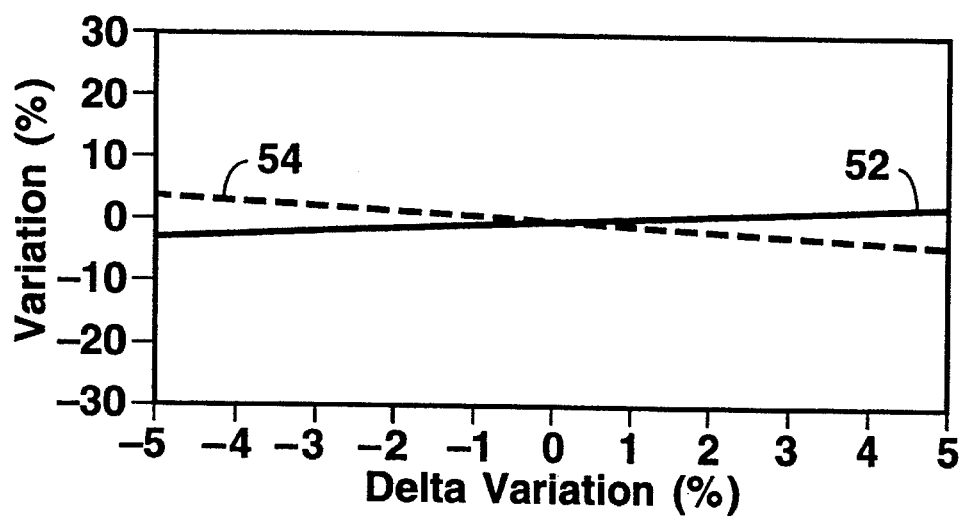
FIG. 6 is a chart of cut off wavelength variation with percent refractive index delta variation.

The sensitivity calculations shown in FIG. 5 and FIG. 6 pertain to a waveguide fiber having four distinct core regions. Referring first to FIG. 5, the percent variation of cut off wavelength, curve 48, and $D_{eff}$, curve 50 is linear with percent variation in core radius. $D_{eff}$ is defined in terms of the propagating electric field E. $D_{eff}=2(A_{eff}/\pi)^{1/2}$, where $$A_{eff}=2\pi(-E^2 r\, dr)^2/(-E^4 r\, dr).$$

The low slope for each of these parameters shows that a process centered to within about 1 percent provides for excellent control of cut off wavelength and $D_{eff}$.

The same is true for process sensitivity to percent variations in refractive index delta. FIG. 6 shows a low slope for cut off wavelength and $D_{eff}$ so that these two properties are substantially invariant with percent changes in index delta of about 1.

TABLE 1

| | Annular Central Core | |
|---|---|---|
| | Mean Value | Standard Deviation |
| Dispersion Zero (nm) | 1527.9 | 18 |
| Dispersion Slope (ps/nm²-km) | 0.0338 | 0.002 |
| Mode Field Dia. (microns) | 7.95 | 0.14 |
| $D_{eff}$ (microns) | 8.11 | 0.13 |
| Cut Off (nm) | 1504 | 21 |
| Bend Loss (dB) | 7.65 | 3.1 |

Table 1, is a model sensitivity study wherein core radius is allowed to vary by ±1 percent and refractive index delta is allowed to vary by ±3 percent. The waveguide values were calculated varying core radius in 0.5% steps and refractive index profile in 1.5% steps. The five sets of waveguide data provide the mean values and standard deviations shown in table 1.

The small standard deviations show the inventive waveguide profile provides an added benefit of ease of manufacturing along with the properties required in a high performance telecommunication system.

Figure 7:
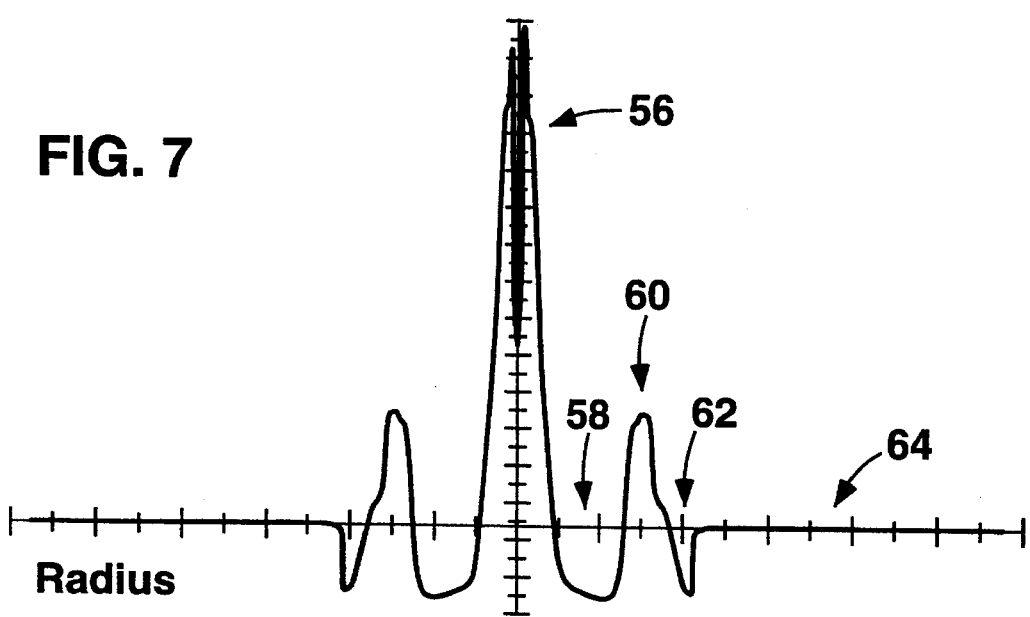
FIG. 7 is a profile measured on a preform made according to an embodiment of the invention.

A refractive index profile of a core preform is shown in FIG. 7. The index profile is the four region type described in example 1 above. The profile parts are the central core region 56, a first annular region 58, a second annular region 60 and a third annular region 62. Regions 58 and 62 are everywhere lower in refractive index than the silica cladding layer 64. The preform was manufactured to provide an optical waveguide fiber having a central core radius of about 3.6 microns, a first annular width of about 5.3 microns, a second annular width of about 2 microns, and a third annular width of about 2 microns. The central region is an alpha profile with alpha equal to about 1 and a maximum refractive index delta percent of 0.9. The respective regions 58, 60, and 62 have characteristic delta indexes –0.1, 0.26, and –0.1. The rounding at the transitions between regions is due to diffusion of dopant during the manufacturing process.

Although particular embodiments of our invention have been disclosed and described above the invention is nevertheless limited only by the following claims.

What is claimed is:

1. A single mode optical waveguide fiber for high performance telecommunication systems comprising:

a core surrounded by a cladding layer, said cladding layer having a refractive index $n_c$;

said core comprising:

a central region having a refractive index profile, and a radius $r_1$; and, a plurality of annular regions surrounding said central region, each said annular region having a refractive index profile and a width, a portion of the refractive index profile of at least one of said annular regions being less than $n_c$;

said optical waveguide fiber having a cut off wavelength greater than 1300 nm and an attenuation less than about 0.25 dB/km;

characterized in that the refractive index profile and radius of said central region, and the refractive index profiles and widths of said annular regions, are chosen to provide an absolute value of total dispersion, of said optical waveguide fiber, in the range of about 0.50 ps/nm-km to 3.5 ps/nm-km and an absolute value of total dispersion slope no greater than about 0.05 ps/nm$^2$-km over a pre-selected wavelength range;

wherein the total dispersion is non-zero over the pre-selected wavelength range.

2. The single mode waveguide fiber of claim 1 wherein said central region has a maximum refractive index $n_1$, and, each of said plurality of annular regions has a maximum refractive index; and, wherein $n_1 > n_c$, and wherein at least one said maximum refractive index of said plurality of annular regions is less than $n_c$.

3. The single mode optical waveguide fiber of claim 1 wherein the innermost one of said plurality of annular regions surrounding said central region has a maximum refractive index $n_2 < n_c$.

4. The single mode optical waveguide fiber of claim 3 wherein said innermost annular region has a constant refractive index.

5. The single mode optical waveguide fiber of claim 1 wherein said refractive index profile of said central region is an alpha profile.

6. The single mode optical waveguide fiber of claim 5 wherein alpha is equal to about 1.

7. The single mode optical waveguide fiber of claim 1 wherein said refractive index profile of said central region is a constant.

8. The single mode optical waveguide fiber of claim 1 wherein said central region is surrounded by a first innermost annular region, a second annular region surrounding said first annular region and a third annular surrounding said second annular region, said annular regions having respective maximum refractive indexes $n_2$, $n_3$ and $n_4$, wherein $n_2$ and $n_4 < n_c$, and $n_3 > n_c$.

9. The single mode optical waveguide fiber of claim 8 wherein said refractive profile of each of said first and third regions is a constant and said refractive index profile of said second region is trapezoidal.

10. The single mode waveguide fiber of claim 9 wherein said central region has a radius in the range of about 2.5 to 4.5 microns and said first, second, and third annular region have respective widths in the ranges of about 3 to 7.5 microns, 1 to 5 microns, and 1 to 7 microns.

11. The single mode optical waveguide fiber of claim 1 wherein said central region is surrounded by a first innermost annular region having a constant refractive index $n_2 < n_c$; and surrounding said first annular region is a second annular region having a trapezoidal refractive index profile and a maximum refractive index $n_3 > n_c$.

12. The single mode optical waveguide fiber of claim 11 wherein said central region has a radius in the range of about 3 to 5 microns, and said first and second annular regions have respective widths in the range of about 3 to 7 microns and 1 to 3 microns.

13. A single mode optical waveguide fiber for high performance telecommunication systems comprising:

a core surrounded by a cladding layer, said cladding layer having a refractive index $n_c$;

said core comprising;

a central region having a refractive index profile and a maximum refractive index $n_1$; and, a plurality of annular regions surrounding said central region, each said annular region having a refractive index profile and a maximum refractive index;

characterized in that the cut off wavelength of said single mode optical waveguide fiber is relatively insensitive to variations in about ±3% refractive index delta and about ±1% core radius.

14. The single mode optical waveguide of claim 13 wherein at least one of said plurality of annular regions has a constant refractive index profile of refractive index $n_i < n_c$.

* * * * *